(12) United States Patent
Hammes et al.

(10) Patent No.: US 7,127,262 B2
(45) Date of Patent: Oct. 24, 2006

(54) METHOD FOR DETERMINING FIELD STRENGTH

(75) Inventors: Markus Hammes, Dinslaken (DE); Britta Felbecker, Bochum (DE); Roland Hellfajer, Bochum (DE)

(73) Assignee: Infineon Technologies AG, Munich (DE)

( * ) Notice: Subject to any disclaimer, the term of this patent is extended or adjusted under 35 U.S.C. 154(b) by 201 days.

(21) Appl. No.: 10/801,939

(22) Filed: Mar. 16, 2004

(65) Prior Publication Data

US 2004/0185791 A1 Sep. 23, 2004

(30) Foreign Application Priority Data

Mar. 18, 2003 (DE) ................. 103 11 967

(51) Int. Cl.
*H04Q 7/20* (2006.01)
(52) U.S. Cl. ................. 455/464; 455/41.2; 455/67.13; 455/450; 455/452.2; 455/455; 370/322; 370/332; 370/333
(58) Field of Classification Search ........... 455/464, 455/41.2, 455, 452.2, 450–452.1, 67.13; 370/332, 333, 322, 319–321; 375/132–136, 375/295, 316
See application file for complete search history.

(56) References Cited

U.S. PATENT DOCUMENTS

| | | | | |
|---|---|---|---|---|
| 5,323,447 A * | 6/1994 | Gillis et al. | ................. | 455/464 |
| 5,448,569 A * | 9/1995 | Huang et al. | ................. | 370/332 |
| 5,630,210 A * | 5/1997 | Marry et al. | ................. | 455/67.13 |
| 5,995,816 A * | 11/1999 | Grayson et al. | ......... | 455/246.1 |
| 6,118,805 A * | 9/2000 | Bergstrom et al. | .......... | 375/132 |
| 6,519,236 B1 * | 2/2003 | Haartsen et al. | ............. | 370/332 |
| 6,597,929 B1 * | 7/2003 | Han et al. | .................... | 455/574 |
| 6,650,872 B1 | 11/2003 | Karlsson | | |
| 6,671,331 B1 * | 12/2003 | Sakuma | ...................... | 375/316 |
| 6,683,886 B1 * | 1/2004 | van der Tuijn et al. | ..... | 370/458 |
| 6,766,160 B1 * | 7/2004 | Lemilainen et al. | ........ | 455/411 |
| 6,816,538 B1 * | 11/2004 | Shuey et al. | ................ | 375/136 |
| 6,859,761 B1 * | 2/2005 | Bensky et al. | ............. | 702/189 |
| 2004/0258137 A1 * | 12/2004 | Felbecker et al. | .......... | 375/133 |

FOREIGN PATENT DOCUMENTS

| | | |
|---|---|---|
| GB | 2178270 A | 2/1987 |
| GB | 2296628 A | 7/1996 |
| JP | 10190551 A | 7/1998 |

OTHER PUBLICATIONS

Fujitsu Ltd., Interference Evading System for Mobile Radio Communication System, Mar. 11, 1994, JP 06-069862 A, Patent Abstracts of Japan (1 page).

(Continued)

*Primary Examiner*—Steve M. D'Agosta
(74) *Attorney, Agent, or Firm*—Eschweiler & Associates, LLC

(57) ABSTRACT

The document specifies a method for determining field strength which can be used in mobile radio systems, such as Bluetooth. The principle proposed involves alternate transmission and reception in the mobile radio system, with each timeslot comprising at least one time interval for transmitting/receiving a data block (RX, TX). The reception field strength (RSSI) is measured directly before (A, B) or directly after (C, D) transmission or reception of the data block (RX, TX). This allows the number of locking operations required in a PLL to be reduced and still allows adaptive channel adjustment to be performed, for example in a "frequency hopping method", by measuring all channels without reducing the net data rate.

19 Claims, 1 Drawing Sheet

OTHER PUBLICATIONS

Toshiba Corp., Mobile Communication System, Apr. 14, 1988, 63084327 A, Patent Abstracts of Japan (1 page).

Matsushita Electric Ind. Co. Ltd., Mobile Station Equipment, Nov. 28, 1997, 09307942 A, Patent Abstracts of Japan (1 page).

* cited by examiner

METHOD FOR DETERMINING FIELD STRENGTH

FIELD OF THE INVENTION

The present invention relates to a method for determining field strength.

BACKGROUND OF THE INVENTION

In modern mobile radio systems, such as in the Bluetooth system, the frequency is spread, in addition to time duplexing, "TDD", Time Division Duplex, by transmitting and receiving on different channels, which is also referred to as frequency hopping, FH. This does not involve transmitting and receiving in a constant physical channel, but rather the frequency of the transmission channel is changed after every timeslot in the data transmission.

If some of these transmission channels contain spectral interference, then it is desirable not to use these channels for the frequency hopping method and instead to move to the remaining channels. Such interference may also be caused by virtue of the physical radio channel in question having already been engaged by another radio system.

In adaptive frequency hopping (AFH) methods, the channels which are subject to interference or are already engaged are suppressed automatically. There are two approaches to doing this:

In a first alternative, the mobile radio connection to be aligned, for example a Bluetooth connection, is influenced such that no interference is produced for another radio connection, such as a wireless local area network (WLAN) connection.

In a second alternative, the radio connection to be aligned is altered such that possible interference by another connection has as little unwanted interfering influence as possible.

In the second case, this can be done using, by way of example, an assessment of the bit error rate or packet error rate on the channels. In the first case, by way of example, the reception field strength can be determined at times at which the radio connection to be aligned is not active, so as to obtain information about the use of these channels by another radio system or about the presence of other unwanted sources of channel interference.

An adaptive frequency hopping method of the type outlined above, which, moreover, works in a time division multiplexing mode, involves transmission and reception only at particular times in "timeslots". In this case, it is usual for reception slots and transmission slots to alternate. In principle, the periods, that is to say the length of the individual timeslots, are of the same length. However, in packet oriented transmission methods, which allow higher data rates, there may also be packets for which the reception or transmission period extends over a plurality of slots. These are called multislot packets.

To implement the first alternative, outlined above, of channel qualification, it is normally assumed that transmission or reception is not permanent, that is to say that data are not exclusively interchanged at the highest data rate, but rather that there are also timeslots which are unused for user data transmission. In this case, these timeslots for which it is known that no data interchange is intended to take place at this point could be used to determine the current field strength of the channel. However, this method has the drawback that the receiver in the radio system needs to be on at the times at which the field strength is intended to be determined. Beforehand, it is additionally necessary to activate the reception-end frequency synthesizer, which also needs to have locked onto the currently active channel frequency at which the evaluation is to take place. In the case of a receiver with a homodyne architecture, the synthesizer needs to lock precisely onto the reception carrier frequency, and in the case of a heterodyne system, which operates at an intermediate frequency, or in the case of a "low IF system", in which the intermediate frequency is particularly low, the evaluation is naturally performed on a channel which is offset by the intermediate frequency. This additional locking of the reception-end synthesizers, normally implemented as a phase control arrangement, and the subsequent activation of the components required for determining field strength in the receiver results in a significant increase in the power consumption, however. This is a disadvantage particularly when, as is usual in modern radio systems, at least one remote station is in the form of a mobile appliance and is battery powered.

If the field strength is supposed to be determined in this outlined manner even at a very high data rate, that is to say with practically exclusive utilization of all the available timeslots by user data, the data rate which can effectively be attained would be reduced with further disadvantage.

To ensure the change between the physical frequencies from timeslot to timeslot in a frequency hopping method, it is usual to provide a predetermined period within each timeslot in which, when a data block's reception or transmission phase has taken place, the reception-end synthesizer can lock onto the new frequency which is desired for the subsequent timeslot.

It is an object of the present invention to specify a method for determining field strength which can be used in a mobile radio system which uses time division duplexing and a frequency hopping method and which has a relatively low power requirement without reducing the effective data rate which can be attained.

SUMMARY OF THE INVENTION

The invention achieves the object by means of a method for determining field strength in a mobile radio system which has the following method steps:
  data are alternately transmitted and received in timeslots, where a timeslot comprises at least one time interval for transmitting or receiving a data block, and
  the reception field strength is measured directly before or directly after transmission or reception of the data block.

The method proposed makes use of the fact that the reception-end synthesizer in the mobile radio system has actually locked onto the new physical channel frequency directly before or directly after transmission or reception of a data block. In a receiver with a low IF architecture, the method can be carried out particularly easily if the synthesizer locks when offset by the intermediate frequency. This advantageously means that no additional power consumption is necessary, which would be required only in order for the synthesizer to lock for the purpose of measuring the reception field strength.

The method described can preferably be used in a frequency hopping method, since the reception field strength can advantageously be detected on all the transmission channels used without additional power consumption and without reducing the effective data rate.

It is particularly advantageous to use the method described in adaptive frequency hopping methods. In this case, it is possible to measure, by way of example, the reception field strength currently present on each channel, and if said reception field strength exceeds a prescribable field strength threshold, for example, a subsequent transmission and reception mode can dispense with the use of this radio channel, at least for a prescribable period. It is thus possible to suppress physical radio channels which have already been engaged by other radio systems or are subject to interference otherwise in an adaptive frequency hopping method without an additional power requirement and without reducing the effective data rate.

The reception field strength is preferably measured directly before the start of transmission or reception of a data block in a timeslot and at the end, but still during a phase which is provided for a synthesizer to lock onto a new frequency in the mobile radio system. In this case, the field strength is measured at the end of a transient phase in a synthesizer in the receiver radio in the mobile radio system. This is possible without difficulty, since the "settling intervals" which are provided in the respective mobile radio standards for the purpose of locking onto a new frequency are normally proportioned to be much longer than the actual locking of a modern synthesizer, which is in the form of a PLL Phase Locked Loop, for example, normally takes.

With particular preference, the field strength determination currently in question can be used in Bluetooth systems, which use spreading of the frequency by means of an adaptive frequency hopping method.

This is advantageous particularly since the Bluetooth system usually operates at carrier frequencies in a band around 2.4 GHz, which is also used for wireless LAN (Local Area Network) applications, which means that other radio traffic can be expected to be present in this frequency band.

Overall, the principle proposed demonstrates a low complexity method for determining the field strength information, particularly for an adaptive frequency hopping method, in which the timeslots used for the normal data transmission can also be used without reducing the effective data rate and virtually without causing any additional power requirement through additional transient processes.

BRIEF DESCRIPTION OF THE DRAWINGS

The invention is explained in more detail below using exemplary embodiments with reference to the drawings, in which.

DETAILED DESCRIPTION

Figure 1:
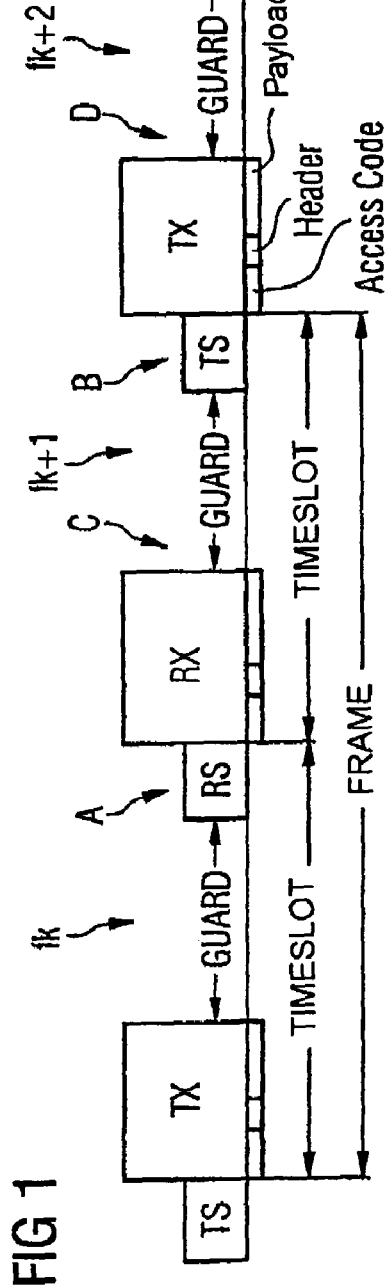
FIG. 1 shows an exemplary time sequence for transmission and reception timeslots in the Bluetooth system, which uses frequency hopping methods and in which four different time periods for taking a field strength measurement are identified according to one embodiment of the invention.

FIG. 1 shows alternating reception and transmission timeslots at changing frequencies plotted against time. A first timeslot is characterized in that transmission takes place at the frequency $f_K$. This transmission timeslot comprises an actual transmitted data block TX, a subsequent "GUARD" safety intermission and then a transient phase RS, which serves to allow a reception-end radio frequency synthesizer to lock onto the frequency of the transmission channel $f_{K+1}$ in the subsequent timeslot.

The second timeslot is a reception timeslot and operates at the transmission frequency $f_{K+1}$, which differs from the frequency of the first timeslot $f_K$ in line with a frequency hopping method. This second timeslot also comprises a data block, in the present case a received data block RX, then a safety intermission GUARD and finally a time interval for a transient phase TS for locking onto the frequency of a subsequent transmission timeslot which operates at yet another frequency $f_{K+2}$. The first and second timeslots at the frequencies $f_K$, $f_{K+1}$ together form a frame.

The third timeslot is again in the form of a transmission timeslot and again comprises a transmitted data block TX, a GUARD time and then a transient phase RS for a subsequent reception timeslot, but this is now not shown. The transient phase at the end of each timeslot to allow a PLL, Phase Locked Loop, or a synthesizer to lock onto a subsequent channel in the next timeslot is also called the settling time.

Each transmitted and received data block RX, TX comprises, at the start, an "access code" with a subsequent header and finally the actual user data, the "payload". The access code and the header are used for transmitting protocol data, synchronization information etc.

The method proposed involves determining the field strength of the respective channel at the frequency of the respective timeslot $f_K$, $f_{K+1}$, $f_{K+2}$ in each case directly before or after the actual transmitted or received data block TX, RX.

Such field strength determination is also referred to as measuring an RSSI (Received Signal Strength Indicator) signal.

All in all, there are therefore four cases which arise for which, in line with the principle proposed, the reception field strength can respectively be measured, the letters A to D serving as reference symbols for the respective point in FIG. 1:

A) directly before the received data block RX, that is to say at the end of the transient phase RS in the preceding transmission timeslot, B) directly before the transmitted data block TS, that is to say at the end of the transient phase TS in the preceding reception timeslot, C) directly after the received data block RX, that is to say at the start of the GUARD period in a reception timeslot, or D) directly after the transmitted data block TX, here also during and at the start of the "GUARD" period in the respective transmission timeslot.

In cases B) and D), that is to say in those cases in which the reception field strength is determined directly before or after the actual transmitted data block TX, the respective mobile radio is briefly changed over to the reception mode of operation, that is to say that some functional parts of the receiver which are required for the RSSI measurement may be turned on. However, this does not require the reception-end radio frequency synthesizer to lock onto a new frequency. In the case of a "direct conversion receiver" architecture, that is to say a homodyne direct conversion architecture, the RSSI information for the respective channel $f_K$, $f_{K+}$, $f_{K+2}$ on which the transmission mode is also intended to occur can then advantageously be evaluated. In the case of an architecture with an intermediate frequency, that is to say in the case of a heterodyne receiver principle, the RSSI information is determined for a channel which is at a distance of the intermediate frequency, which is known, of course, away from the channel on which the transmission mode should occur. As a result, the synthesizer advantageously does not need to lock onto a new frequency again.

By way of example, this is possible without any problem in a radio system which uses a combination of a time division multiple access (TDMA) method and frequency hopping spread spectrum (FHSS) technology.

If the RSSI measurement comes directly before or after the actual transmitted data block TX, as envisaged in cases B) and D), then the additional advantage is obtained that it is possible to be certain that no other subscriber is simultaneously transmitting in the jointly used radio network (Piconet, in the case of Bluetooth) and the currently ascertained RSSI signal power would then be detected, but rather, since the respective timeslot has been allocated for a dedicated purpose, in reality only the desired transmission power radiated by the foreign Piconet in the case of Bluetooth can be detected.

Taking the RSSI measurement in case C) at the end of a received data block RX means that the respective radio receiver continues to remain activated after all of the user data bits have been received, and hence the reception field strength can be evaluated without any problem.

In case D), that is to say with RSSI measurement directly after a transmitted data block TX, the transmission mode in the respective radio is changed to the reception mode. To this end, as already explained, the radio frequency synthesizer contained in the radio does not need to lock again. If appropriate, analogue filters in the reception path may even be trimmed as well if necessary. An advantage of taking the measurement in line with alternative D) is that the current transmission phase TX is controlled by the measuring appliance itself, that is to say that the number of bits of information to be transmitted in the data block TX is likewise known, like any additional transmitted data in a "multislot packet mode".

The measurement based on the proposed principle is taken, regardless of whether a heterodyne or a homodyne architecture principle is used, in a radio channel in which the principle proposed means that there is no transmission power corrupting the measurement through the dedicated connection.

The periods for the radio frequency synthesizer, the "PLL" (Phase Locked Loop), to lock which are prescribed by specifications for mobile radio systems, such as Bluetooth, are normally proportioned such that a period for the brief evaluation of the field strength information, as proposed in cases A) and B), is provided without any problem.

Since field strength measurement does not require radio frequency synthesizers in the respective mobile radio system to lock again, the principle proposed can be implemented with a small power requirement.

Since no unused timeslots, "blind slots", are used for the proposed reception field strength measurement and no special timeslots need to reserved for reception field strength measurement, the effective user data rate is advantageously not reduced with the proposed method. Instead, previously unused time periods, such as the end of the transient phase TS, RS, or "GUARD" time intervals are used in order to listen into the frequency domain being used: and hence to be able to suppress particular channels automatically when using an adaptive frequency hopping method, for example.

Figure 2:
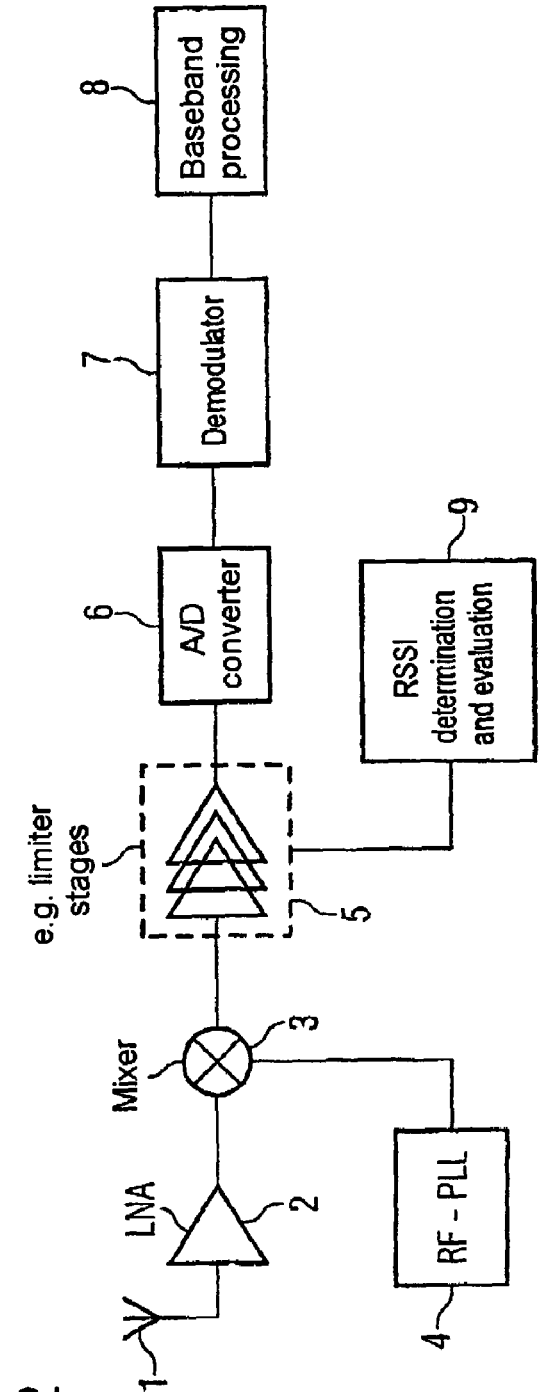
FIG. 2 shows an exemplary radio in a mobile radio system with reception field strength measurement using a block diagram, in which the proposed method can be used according to another embodiment of the invention.

FIG. 2 shows, by way of example, a block diagram of a radio receiver with a heterodyne, that is to say a low IF, architecture, i.e. a "low IF receiver". The low IF receiver has an antenna 1 which is routed to a radio frequency mixer 3 via a low noise preamplifier 2. A further input on the mixer 3 is connected to the output of a frequency synthesizer 4 which is respectively operated at a particular carrier frequency, so that the output of the mixer provides the modulation signal at an intermediate frequency IF carrier frequency. Connected to the output of the mixer 3 is, by way of example, a multistage limiting amplifier 5 whose output is routed to a baseband signal processing unit 8 via an analogue/digital converter 6 and a demodulator 7. A further output on the multistage limiting amplifier 5 is designed to provide an RSSI (Received Signal Strength Indicator) signal and is connected to a block for determining and evaluating the reception field strength.

In order to be able to output the modulation signal at an intermediate frequency IF at the output, the synthesizer 4 is always set straight to that carrier frequency which is shifted with respect to the received signal by the sum of the intermediate frequency. When a frequency hopping method is being used, it goes without saying that the synthesizer needs to lock onto a new frequency at the end of each timeslot, namely onto the new carrier frequency for the subsequent timeslot's channel. This is done during the "transient phase" or settling time RS, TS at the end of each timeslot for the subsequent timeslot.

As already explained, the principle proposed is not limited to the illustrated architectural principle of a low IF conversion receiver, but rather can also be used, by way of example, for homodyne receivers and also for "direct conversion receivers".

Lost of Reference Symbols
1 Antenna
2 Low noise amplifier
3 Mixer
4 Synthesizer, PLL
5 Limiter
6 Analogue/digital converter
7 Demodulator
8 Baseband processing
9 RSSI evaluation
A RSSI before RX
B RSSI before TX
C RSSI after RX
D RSSI after TX
TS Transmission transient phase
RS Reception transient phase
GUARD Safety time window
$f_K$ Channel 1
$f_{K+1}$ Channel 2
$f_{K+2}$ Channel 3
TX Transmitted data block
RX Received data block

What is claimed is:
1. A method for determining frequency channel quality in a mobile radio system, comprising:
  in a predetermined temporal sequence of transmit time intervals and receive time intervals, transmitting respective data blocks on respective frequency channels during respective ones of the transmit time intervals and receiving respective data blocks on respective frequency channels during respective ones of the receive time intervals; and
  for a first of the time intervals which has associated therewith a corresponding first frequency channel, making a received signal strength measurement on the first frequency channel during a period of time between the first time interval and a second of the time intervals that is adjacent the first time interval in the temporal sequence and not during the first time interval and the second of the time intervals, wherein the second time interval precedes the first time interval in the temporal sequence; and locking onto the first frequency channel during a frequency locking portion of the period of time between the first and second time intervals, wherein the making step includes making the received signal strength measurement during the frequency locking portion and after locking onto the first frequency channel.

2. The method of claim 1 including using frequency hopping to select the frequency channels.

3. The method of claim 2 including providing the mobile radio system as a Bluetooth system.

4. The method of claim 1 including providing the mobile radio system as a Bluetooth system.

5. The method of claim 1 including using adaptive frequency hopping to select the frequency channels.

6. The method of claim 5 wherein said using step includes removing the first frequency channel from an adaptive frequency hopping pattern based on the measured received signal strength.

7. The method of claim 6 including providing the mobile radio system as a Bluetooth system.

8. The method of claim 5 including providing the mobile radio system as a Bluetooth system.

9. The method of claim 1 including providing the mobile radio system as a Bluetooth system.

10. The method of claim 1 wherein the transmit time intervals and the receive time intervals occur alternately in the temporal sequence.

11. A method for determining frequency channel quality in a mobile radio system, comprising:

in a predetermined temporal sequence of transmit time intervals and receive time intervals, transmitting respective data blocks on respective frequency channels during respective ones of the transmit time intervals and receivinq respective data blocks on respective frequency channels durinq respective ones of the receive time intervals;

for a first of the time intervals which has associated therewith a corresponding first frequency channel, making a received signal strength measurement on the first frequency channel during a period of time between the first time interval and a second of the time intervals that is adjacent the first time interval in the temporal sequence and not during the first time interval and the second of the time intervals; and using adaptive frequency hopping to select the frequency channels, wherein the using step includes removing the first frequency channel from an adaptive frequency hopping pattern based on the measured received signal strength, wherein the second time interval precedes the first time interval in the temporal sequence, and including locking onto the first frequency channel during a frequency locking portion of the period of time between the first and second time intervals, said making step including making the received signal strength measurement during the frequency locking portion and after locking onto the first frequency channel.

12. The method of claim 11 including providing the mobile radio system as a Bluetooth system.

13. A method for determining frequency channel quality in a mobile radio system, comprising:

in a predetermined temporal sequence of transmit time intervals and receive time intervals, transmitting respective data blocks on respective frequency channels during respective ones of the transmit time intervals and receiving respective data blocks on respective frequency channels during respective ones of the receive time intervals;

for a first of the time intervals which has associated therewith a corresponding first frequency channel, making a received signal strength measurement on the first frequency channel during a period of time between the first time interval and a second of the time intervals that is adjacent the first time interval in the temporal sequence and not during the first time interval and the second of the time intervals; and using adaptive frequency hopping to select the frequency channels, wherein the second time interval precedes the first time interval in the temporal sequence, and including locking onto the first frequency channel during a frequency locking portion of the period of time between the first and second time intervals, said making step including making the received signal strength measurement during the frequency locking portion and after locking onto the first frequency channel.

14. The method of claim 13 including providing the mobile radio system as a Bluetooth system.

15. A method for determining frequency channel quality in a mobile radio system, comprising:

in a predetermined temporal sequence of transmit time intervals and receive time intervals, transmitting respective data blocks on respective frequency channels during respective ones of the transmit time intervals and receiving respective data blocks on respective frequency channels during respective ones of the receive time intervals;

for a first of the time intervals which has associated therewith a corresponding first frequency channel, making a received signal strength measurement on the first frequency channel during a period of time between the first time interval and a second of the time intervals that is adjacent the first time interval in the temporal sequence and not during the first time interval and the second of the time intervals, wherein the second time interval precedes the first time interval in the temporal sequence, and including locking onto the first frequency channel during a frequency locking portion of the period of time between the first and second time intervals, said making step including making the received signal strength measurement during the frequency locking portion and after locking onto the first frequency channel.

16. The method of claim 15 including providing the mobile radio system as a Bluetooth system.

17. A method for determining field strength in a mobile radio system, comprising:

alternately transmitting and receiving data in timeslots, wherein a timeslot comprises at least one time interval for transmitting or receiving a data block; and measuring a reception field strength directly before or directly after transmission or reception of the data block and not during the transmission or reception of the data block, wherein the second time interval precedes the first time interval in the temporal sequence, and including locking onto the first frequency channel during a frequency locking portion of the period of time between the first and second time intervals, said making step including making the received signal strength measurement during the frequency locking portion and after locking onto the first frequency channel.

18. The method of claim 17, further comprising suppressing a radio channel associated with the transmitting or receiving of the data block as part of an adaptive frequency hopping method if the measured field strength is greater than a prescribed threshold value.

19. The method of claim 17, wherein the field strength is measured directly before transmission or reception of the data block, but still during a transient phase of locking onto a new frequency in the mobile radio system.

* * * * *